(12) United States Patent
Mallen

(10) Patent No.: US 7,067,737 B2
(45) Date of Patent: Jun. 27, 2006

(54) COVER PLATE

(76) Inventor: Kenneth J. Mallen, 18682 Paseo Cortez, Irvine, CA (US) 92612

( * ) Notice: Subject to any disclaimer, the term of this patent is extended or adjusted under 35 U.S.C. 154(b) by 0 days.

(21) Appl. No.: 10/942,309

(22) Filed: Sep. 16, 2004

(65) Prior Publication Data

US 2005/0109528 A1 May 26, 2005

Related U.S. Application Data

(60) Provisional application No. 60/503,256, filed on Sep. 16, 2003.

(51) Int. Cl.
*H02G 3/14* (2006.01)

(52) U.S. Cl. .................... 174/66; 174/67; 220/241
(58) Field of Classification Search .............. 174/66, 174/67; 220/241, 242
See application file for complete search history.

(56) References Cited

U.S. PATENT DOCUMENTS

| | | | |
|---|---|---|---|
| 2,438,143 A | 3/1948 | Brown | |
| 2,943,138 A | 6/1960 | Reager | |
| 3,331,915 A | 7/1967 | Lucci | |
| D244,254 S | 5/1977 | Creamer | |
| 4,239,167 A | 12/1980 | Lane | |
| 4,335,863 A | 6/1982 | Rapps | |
| 4,339,045 A | 7/1982 | Bodin | |
| 4,425,725 A | 1/1984 | Moustakas et al. | |
| 4,702,709 A | 10/1987 | Santilli | |
| 4,921,444 A * | 5/1990 | Cama | 439/528 |
| 5,594,206 A | 1/1997 | Klas et al. | |
| D402,271 S | 12/1998 | Weinberg | |
| D405,347 S | 2/1999 | Mezey | |
| 5,914,826 A | 6/1999 | Smallwood | |
| D412,886 S | 8/1999 | Doran | |
| 6,130,384 A | 10/2000 | Esteves et al. | |
| 6,404,569 B1 | 6/2002 | Bachschmid et al. | |

* cited by examiner

*Primary Examiner*—Dhiru R. Patel
(74) *Attorney, Agent, or Firm*—The Webb Law Firm

(57) ABSTRACT

Disclosed is a cover plate for use in connection with an electrical box. The cover plate includes a plate element that attaches to and at least partially covers a side of the electrical box. The plate element includes at least one electrical box orifice to permit access to an electrical appurtenance associated with the electrical box. The cover plate also includes one or more attachable elements removably attachable to a portion of the plate element via an attachment structure. The attachable elements are configured to retain, display and/or interact with an item.

27 Claims, 2 Drawing Sheets

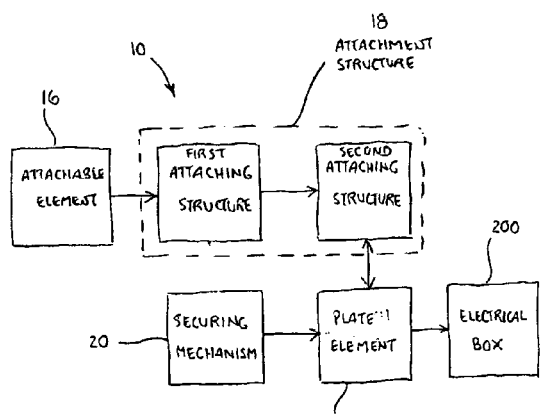
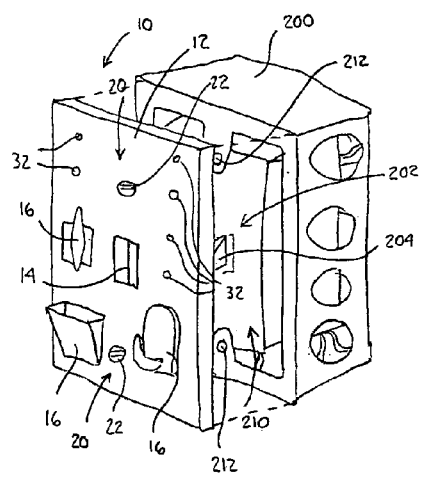
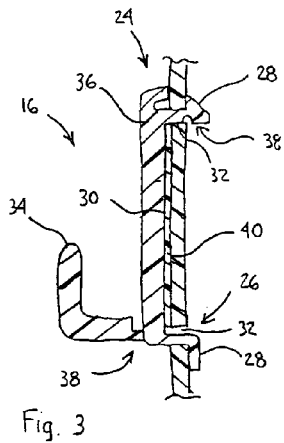
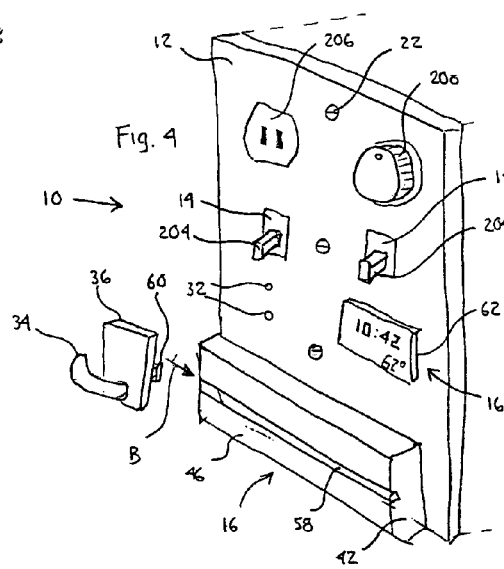
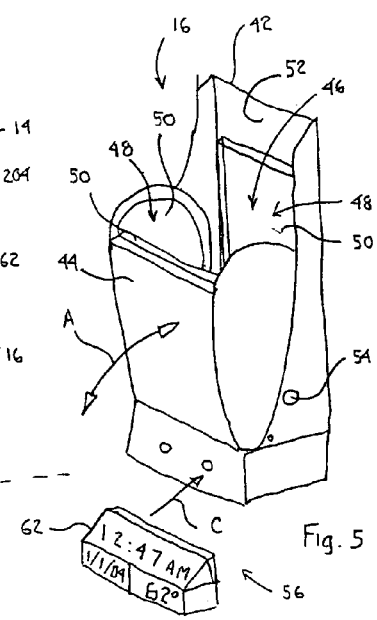

COVER PLATE

CROSS REFERENCE TO RELATED APPLICATIONS

This application claims the benefit of U.S. Provisional Patent Application No. 60/503,256, filed Sep. 16, 2003 and United States Provisional Patent Application entitled "Switch Plate with Cell Phone Holder, Key Accessory Hooks With/Without Message Center", filed Apr. 23, 2004, which are herein incorporated by reference in their entirety.

BACKGROUND OF THE INVENTION

1. Field of the Invention

The present invention relates in general to cover plates for use in connection with electrical boxes, such as electrical boxes that include wall-mounted switch plates and have one or more actuator switches and/or electrical outlets and, in particular, to a cover plate that is positioned over one or more of the electrical appurtenances of the electrical box and that provides additional storage, display and interactive functionality.

2. Description of Related Art

According to the prior art, there are many electrical boxes available that offer various functions to the end user and electrical access, for example switchboxes, electrical outlets, combination boxes and other similar wall-mounted switches and outlets. Presently, however, the switch plate covers and outlet covers for such boxes and outlets are plain plates that have only a single function, which is to provide a protective cover over an electrical box. Accordingly, prior art switch plates do not provide any additional functionality with relation to that specific area around or adjacent to the switch plate cover.

Oftentimes, people misplace or forget where they have placed their keys, cell phones, PDAs, wallets and other similar items and objects. In particular, these items are misplaced since people do not generally have a single designated place where they habitually place their keys when they remove them from their person. Accordingly, these items end up lost and a considerable amount of time and resources are wasted searching for the item.

In one attempt to solve this problem, and according to the prior art, wall-mounted keyholders are available. However, these holders are designed to be permanently attached to the wall, either by nails, screws or the like, which require new holes to be drilled or punched or secured with an anchor. Next, these screws or nails must be placed into the drilled holes and secured with some attachment mechanism in order to hold the wall-mounted keyholder against the wall.

In addition, certain switch plates have been developed that may be used in place of the prior art and commonly-known switch plates used in the vast majority of commercial and residential structures. In addition, some of these modified switch plates evidence integrally formed appurtenances or projections that allow the switch plate to achieve various functions. For example, see U.S. Pat. No. 4,335,883 to Rapps; U.S. Pat. No. 4,425,725 to Moustakas et al.; U.S. Pat. No. 5,594,206 to Klas et al.; U.S. Pat. No. 6,404,569 to Bachschmid et al.; U.S. Pat. No. 5,914,826 to Smallwood; and U.S. Pat. No. 4,239,167 to Lane. In addition, certain switch plates have been developed that include projecting elements or surfaces that can be used to retain a plug or a cord that is associated with an electrical outlet. For example, see U.S. Pat. No. 4,702,709 to Santilli; U.S. Pat. No. 3,331,915 to Lucci; U.S. Pat. No. 2,438,143 to Brown; and U.S. Pat. No. 2,943,138 to Reager.

However, these prior art wall-mounted keyholders and modified switch plates have several drawbacks. First and foremost, not everyone has a cellular phone, or a PDA or uses a wallet, etc. Therefore, the prior art pre-molded and modified switch plates do not allow for any flexibility or consumer options for additional modification. Therefore, there remains a need for a switch plate that allows for the consumer, as opposed to the manufacturer, to make the decision of what type of retaining element or attachable element to use. In addition, there are certain safety concerns when a hook is permanently attached to a modified switch plate, or integrally formed therewith. In particular, such a hook would pose a hanging hazard and other similar safety issues with respect to both pets and small children. Accordingly, there remains a need for a modified switch plate that includes the appropriate structure to safeguard one's children, pets, etc.

SUMMARY OF THE INVENTION

It is, therefore, an object of the present invention to provide a cover plate that overcomes the deficiencies of the prior art. It is another object of the present invention to provide a cover plate that allows for the variable positioning of different retaining elements and attachable elements, which allows the consumer to choose how to configure the cover plate. It is another object of the present invention to provide a cover plate that breaks away or otherwise disengages from the wall in order to ensure the safety of various persons and pets. It is a still further object of the present invention to provide a cover plate that allows for the retainment, storage, display or interaction with various items and objects. It is yet another object of the present invention to provide a cover plate that is simple in its manufacture and easy in its installation.

Accordingly, the present invention is directed to a cover plate for use in connection with an electrical box, for example a switchbox, an outlet box, a combined switch and outlet box, etc. The cover plate of the present invention includes a plate element that attaches to and at least partially covers a side of the electrical box, typically the side that has electrical appurtenances extending therefrom, such as switches, outlets, knobs, etc. The plate element includes one or more electrical box orifices that would permit access to these electrical appurtenances. The cover plate also includes one or more attachable elements that are removably attachable to a portion of the plate element via an attachment structure. The attachable element is configured to retain, display and/or interact with an item or object.

The attachable element may be a variety of various structures, equipment, devices, etc. For example, the attachable element may be a clock, a messaging device, an electronic device, a computing device, a tray, a thermostat, a thermometer, a hook, an enclosure, a container, a holder, a bin, a change holder, a mace holder, a bathroom appliance holder, an electrical cord retainer, a kitchen appliance holder, a household item holder, a remote control holder, an electronic device holder, etc. In addition, the attachable element may retain an electronic device, a computing device, a cellular phone, mail, currency, a wallet, money, a key, a keyring, an item, an object, a remote control, a writing utensil, etc. Therefore, the cover plate of the present invention allows a user to contain, display and/or interact with a variety of items of the user's choice.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 1 is a schematic view of the preferred embodiment of a cover plate according to the present invention;

FIG. 2 is a perspective view of a further embodiment of a cover plate according to the present invention and an electrical box according to the prior art;

FIG. 3 is a side sectional view of an attachable element attached to a plate element according to the present invention;

FIG. 4 is a perspective view of a further embodiment of a cover plate according to the present invention as attached to an electrical box;

FIG. 5 is a perspective view of an attachable element according to the present invention for retaining an electronic device;

DESCRIPTION OF THE PREFERRED EMBODIMENTS

Figure 6:
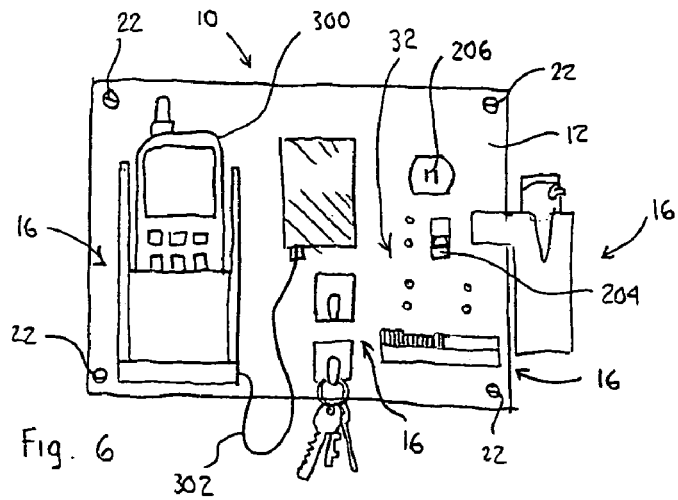
FIG. 6 is a front view of a cover plate according to the present invention as attached to an electrical box and retaining and displaying various items.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a cover plate 10 for use in connection with an electrical box 200. The electrical box 200 is an electrical junction location that provides various electrical services to the consumer. For example, the electrical box 200 may be a switchbox, an outlet box, an electrical utility box, a combined switch and outlet box, etc. As is known in the art, the electrical box 200 would include various electrical appurtenances 202 that are associated therewith. For example, the electrical appurtenance 202 may be a switch 204, an outlet 206, a knob 208, etc. Again, as is known in the art, the switch 204 would be used to turn the electricity on and off, for example, turning the lights on and off. The outlet 206 would be used to plug various electrical devices into the electrical box 200. The knob 208 would be used to provide thermostat or adjustable control of various electrical devices.

The cover plate 10 of the present invention is illustrated in various embodiments in FIGS. 1–10. In general, the cover plate 10 includes a plate element 12 that is attachable to or at least partially covers a side 210 of the electrical box 200. In addition, the plate element 12 includes at least one, and typically multiple, electrical box orifices 14 that permit access to the electrical appurtenances 202 of the electrical box 200. Therefore, the electrical box orifices 14 are configured to allow a switch 204 or knob 208 to pass therethrough, or to otherwise allow access to an outlet 206. The cover plate 10 also includes at least one attachable element 16 that is removably attachable and engageable with a portion of the plate element 12 via an attachment structure 18. Further, the attachable element 16 is sized and shaped so that it may retain, display and/or interact with an item or object, as discussed in detail hereinafter.

In order to attach the cover plate 10 to the electrical box 200, the cover plate 10 also includes a securing mechanism 20 for removably attaching the plate element 12 at least partially over the open side 210 of the electrical box 200. In particular, and according to the prior art, the electrical box 200 includes multiple orifices 212, and these orifices 212 threadedly engage with the securing mechanism 20 of the present invention. Therefore, in one preferred and non-limiting embodiment, the securing mechanism 20 is one or more screws 22 to allow a user to insert the screw 22 through the plate element 12 and further through the orifices 212 of the electrical box 200, and subsequently securely attach the cover plate 10 over the electrical box 200.

In one preferred embodiment, the attachment structure 18 includes a first attaching structure 24 and a second attaching structure 26. The first attaching structure 24 is in operational communication with the attachable element 16, and the second attachment structure 26 is in operational communication with the plate element 12. In a further preferred and non-limiting embodiment, and as illustrated in FIG. 3, the first attaching structure 24 is one or more projecting elements 28 that extend from a surface 30 of the attachable element 16. In addition, the second attaching structure 26 is one or more orifices 32 that extend through the plate element 12 and are configured to engage with and at least partially accept the projecting element 28. In yet another preferred embodiment, multiple projecting elements 28 extend from the surface 30 of the attachable element 16, and multiple orifices 32 are configured to engage and at least partially accept a respective projecting element 28.

In order to provide the maximum flexibility to the consumer regarding the attachment and positioning of the attachable element 16 on the plate element 12, multiple and spaced orifices 32 extend through the plate element 12 for engaging with and accepting a projecting element 28 in a removable manner. See FIG. 2. Accordingly, a user can simply disengage the attachable element 16 from one set of orifices 32, and re-engage either a different attachable element 16 in the same orifices 32, or alternatively the same attachable element 16 to a different set of orifices 32. This allows the user to choose the various functions they wish to achieve with the various attachable elements 16 offered. Therefore, since the attachable element 16 is removable and re-attachable to the plate element 12 via the attachent structure 18, the same attachable element 16 can be positioned on multiple areas of the plate element 12 according to the user's needs.

As seen in FIG. 3, the attachable element 16 may be a hook 34 extending from a hook base portion 36. The hook 34 would allow a user to hang an item on the hook 34, such as keys and the like. In addition, the hook 34 may be positioned on various portions of the plate element 12 using the various orifices 32 available.

In one aspect of the present invention, the attachable element 16, the attachment structure 18 and/or the plate element 12 include a breakaway portion 38. In particular, this breakaway portion 38 allows the attachable element 16 to break away from the plate element 12 upon the occurrence of a predetermined break force. Further, the breakaway portion 38 may be a notch, a weakened area or a releasable adhesive material 40. Of course, any combination of breakaway portions 38 may be used to achieve the appropriate breakpoint at the predetermined break force. For example, the notch, weakened area or releasable adhesive material 40 may be configured to allow the attachable element 16, such as the hook 34, to break away from the plate element 12 when a five-pound force is applied. Any predetermined break force may be used.

In a further preferred and non-limiting embodiment, the attachable element 16 includes a frame portion 42 and a door portion 44, which is movably attached or attachable to the frame portion 42. In this manner, the door portion 44 is removable away from and towards the frame portion 42, thereby providing access to an attachable element inner retaining area 46. As seen in FIGS. 5 and 6, the frame portion 42 may be sized and shaped so as to removably retain an electronic device 300 therein. For example, the electronic device 300 may be a cellular phone or a PDA, which can be inserted into the inner retaining area 46 of the frame portion 42. In order to easily remove and/or insert the electronic device 300 into the frame portion 42, the door portion 44 is moved towards and away from the frame portion 42 in the direction of arrow A. This provides the user easy access to the electronic device 300.

In another embodiment, the frame portion 42 includes a gripping structure 48 for engaging and securely holding the electronic device 300 within the frame portion 42, and specifically within the inner retaining area 46 of the frame portion 42. In one embodiment, the gripping structure 48 is one or more padding elements 50 that are positioned on an inner surface 52 of the frame portion 42. Accordingly, electronic device 300 is frictionally engaged with the frame portion 42 by inserting and contacting the electronic device 300 with one or more of the padding elements 50. The padding elements 50 may be flexible and have certain shape memory retention characteristics, such that the padding elements 50 are deformed when the electronic device 300 is inserted in the frame portion 42, and return to the original state after the electronic device 300 is removed from the frame portion 42.

As is known in the prior art, the vast majority of electronic devices 300 include electrical cords 302 that are used to either operate or recharge the battery associated with electronic device 300. Therefore, and as best seen in FIG. 5, the frame portion 42 may include one or more plug orifices 54 that provide passage of a portion of the electrical cord 302 of the electronic device 300. In this manner, the electronic device 300 may be docked or otherwise placed in and subsequently charged when positioned in the frame portion 42 and connected to the electrical cord 302 (which is connected to an outlet 206 accessible through the plate element 12). It is also envisioned that the frame portion 42 may have some other positioning structure that allows the user to simply engage the electronic device 300 with the frame portion 42 without first connecting the electrical cord 302 to the electronic device 300. In essence, the frame portion 42 would act as a docking station and allow the electronic device 300 to be charged whenever it is positioned in the frame portion 42. While discussed in connection with a cellular phone or a PDA, the electronic device 300 may be a variety of devices. For example, the electronic device 300 may be a palmtop, a computing device, an electric razor, a hairdryer, a toothbrush, a curling iron, etc.

In a still further preferred and non-limiting embodiment, the cover plate 10 may include an ancillary element 56, which is removably attachable to the plate element 12 and/or the attachable element 16. As shown in one embodiment in FIG. 4, the attachable element 16 may include a frame portion 42 that includes a slot 58 extending across a surface of the frame element 42. In this embodiment, the ancillary element 56 is a hook 34 having a hook base portion 36, as discussed above in connection with the attachable element 16. However, the hook 34 of this embodiment includes a modified projecting element 60 extending from the hook base portion 36. This modified projecting element 60 is receivable within and along the slot 58, such that the user may simply engage the modified projecting element 60 with the slot 58 and slide (in direction of arrow B) the hook 34 to an appropriate location along the slot 58 and attachable element 16. Further, multiple hooks 34 may be used and slid along the slot 58 to provide greater customizability with respect to the ancillary element 56 and the attachable element 16. Still further, as opposed to a hook 34, any number of various attachable elements 16 (and ancillary elements 56) may include the modified projecting element 60 extending therefrom. In this manner, as opposed to using the orifices 32 to customize the cover plate 10, the user may simply use the slot 58 structure discussed above with various ancillary elements 56, such as a hook, a tray, a container, a bin, etc.

In the further embodiment, the ancillary element 56 is a clock 62. As with the previously-discussed hook 34 (when used as an ancillary element 56), the clock 62 includes appropriate attaching structure to removably attach the clock 62 to a portion of the attachable element 16. In operation, the user may simply press and engage the clock 62 against a face of the attachable element 16 in the direction of arrow C, and similarly the user may also remove the clock 62 from the attachable element 16. In this embodiment, the ancillary element 56 is a clock 62 with a thermometer reading, and the attachable element 16 is an electronic device holder 64.

As seen in FIG. 6 in use, various items may be retained by, attached to or otherwise displayed by the attachable element 16, as connected to the plate element 12. Further, in the embodiment of FIG. 6, the plate element 12 is attached to the electrical box 200, with the various appurtenances 202 extending therethrough, including a switch 204 and multiple outlets 206.

Figure 7:
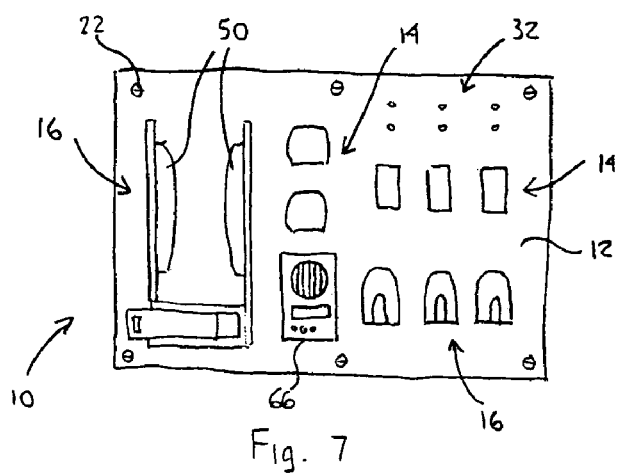
FIG. 7 is a front view of a further embodiment of a cover plate according to the present invention.

FIG. 7 illustrates a cover plate 10 with multiple attachable elements 16 attached thereto prior to installation on an electrical box 200. In this embodiment, one of the attachable elements 16 is a messaging device 66. In particular, the messaging device 66 allows a user to record and play back messages which provides even greater functionality of the cover plate 10. When used in connection with an attachable element 16 that is an electronic device holder 64, such as a cellular phone holder, the messaging device 66 is particularly useful to quickly record and play back messages as a user is utilizing the cellular phone. As with the other attachable element 16, the messaging device 66 may be removable from the plate element 12 and placed on various cover plates 10 throughout the household that are located at or near a position that the user would like to record or play back messages.

Figure 8:
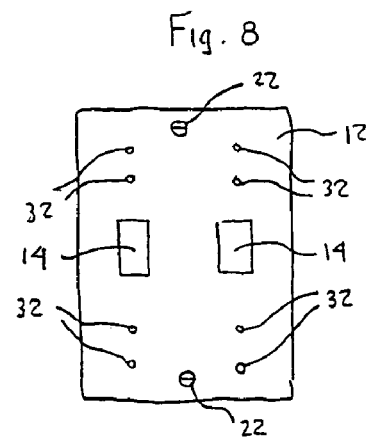
FIG. 8 is a front view of a still further embodiment of a cover plate according to the present invention.
Figure 9:
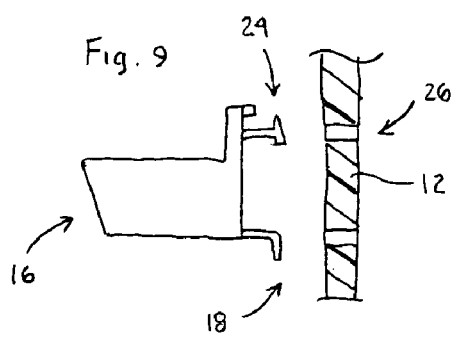
FIG. 9 is a side and partial sectional view of an attachable element for attachment to a plate element according to the present invention.
Figure 10:
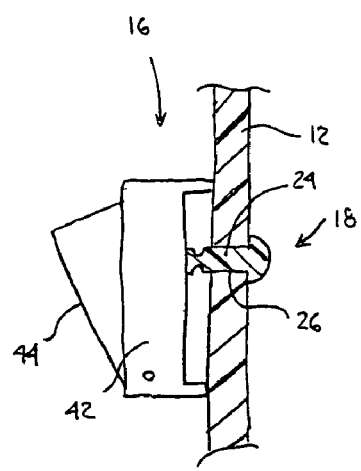
FIG. 10 is a side and partial sectional view of an attachable element attached to a plate element according to the present invention.

As seen in FIG. 8, the plate element 12 includes appropriate orifices 32 for attaching multiple attachable elements 16, as well as electrical box orifices 14 for placement over the various electrical appurtenances 202, but providing access thereto. Of course, the plate element 12 may be manufactured to include a variety of separately positioned orifices 32, and matching electrical box orifices 14 for attachment to a specifically designed electrical box 200, as is known in the art. The attachment structure 18 of the cover plate 10, as discussed above, may take various shapes and sizes. For example, see FIGS. 9 and 10. Specifically, FIG. 9 illustrates a frame portion 42 in the form of a tray, and FIG. 10 illustrates a frame portion 42 together with a door portion 44 that is openable and closeable.

In order to provide maximum flexibility, the ancillary element 56 and the attachable element 16 may take a variety of shapes, sizes, forms and functions. For example, the ancillary element 56 and/or the attachable element 16 may be a clock 62, a messaging device 66, an electronic device 300, a computing device, a tray, a thermostat, a thermometer, a hook 34, an enclosure, a container, a holder, a bin, a change holder, a mace holder, a bathroom appliance holder, an electrical cord retainer, a kitchen appliance holder, a household item holder, a remote control holder, an electronic device holder, etc. Accordingly, either the attachable element 16 and/or the ancillary element 56 may be specifically configured to retain an electronic device 300, a computing device, a cellular phone, mail, currency, money, a wallet, a key, a keyring, an item, an object, a remote control, a writing utensil, etc.

Turning to the manufacture of the present invention, the cover plate 10, the plate element 12, the attachable element 16 and/or the attachment structure 18 may be manufactured from a variety of materials. For example, these items may be manufactured from a plastic, a synthetic material, a polymer, a metallic material, wood, etc. In one preferred and non-limiting embodiment, the attachable element 16, together with the attachment structure 18, are manufactured in a molded process using a polymeric material. Accordingly, the attachment element 16 and the attachment structure 18, specifically the first attaching structure 24, are manufactured as an integral unit. Still further, as discussed above, various portions of the attachable element 16 and/or the first attaching structure 24 include appropriate breakaway portions 38, which provides important safety precaution functions. However, any material of construction of the various components and subcomponents of the cover plate 10 are envisioned.

In this manner, the present invention provides a cover plate 10 that is modified for use in connection with an electrical box 200. The cover plate 10 includes a removable attachable element 16, and typically multiple attachable elements 16, that provide a variety of functions for retaining, displaying or otherwise interacting with an item or object. In addition, the multiple sets of orifices 32 allow a user to customize the look and function of the cover plate 10 according to their own needs. Further, when used in connection with the breakaway portions 38, the cover plate 10 includes the necessary safety precautions to prevent injury of children, pets, etc.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A cover plate for use in connection with an electrical box, the cover plate comprising:
    a plate element configured to attach to and at least partially cover a side of the electrical box, wherein the plate element includes at least one electrical box orifice configured to permit access to at least one electrical appurtenance associated with the electrical box; and
    at least one attachable element removably attachable to a portion of the plate element via an attachment structure comprising a first attaching structure in operational communication with the attachable element and a second attaching structure in operational communication with the plate element,
    wherein the at least one attachable element is configured to at least one of retain, display and interact with an item.

2. The cover plate of claim 1, wherein the electrical box is at least one of a switch box, an outlet box, an electrical utility box and a combined switch and outlet box.

3. The cover plate of claim 1, further comprising a securing mechanism for securing the plate element at least partially over an open side of the electrical box.

4. The cover plate of claim 3, wherein the securing mechanism is at least one screw configured to threadedly engage a corresponding orifice of the electrical box.

5. The cover plate of claim 1, wherein the first attaching structure is at least one projecting element extending from a surface of the attachable element and the second attaching structure is at least one orifice extending through the plate element and configured to engagingly and at least partially accept the projecting element.

6. The cover plate of claim 1, wherein the first attaching structure is a plurality of projecting elements extending from a surface of the attachable element and the second attaching structure is a plurality of spaced orifices extending through the plate element and configured to engagingly and at least partially accept a respective projecting element.

7. The cover plate of claim 1, wherein the second attaching structure is a plurality of spaced orifices extending through the plate element and configured to engagingly and at least partially accept a projecting element in a removable manner.

8. The cover plate of claim 1, wherein the attachable element is removable and attachable to the portion of the plate element via the attachment structure, such that the attachable element may be positioned on a plurality of areas on the plate element.

9. The cover plate of claim 1, wherein the attachable element is a hook extending from a hook base portion and configured to permit a user to hang the item on the hook.

10. The cover plate of claim 9, wherein at least a portion of the hook is notched, such that the hook breaks away from the hook base portion upon the occurrence predetermined break force.

11. The cover plate of claim 1, wherein the attachable element includes a frame portion configured to removably retain an electronic device therein.

12. The cover plate of claim 11, wherein the frame portion includes a gripping structure configured to engage and securely hold the electronic device.

13. The cover plate of claim 11, further comprising a door portion movably attached to the frame portion, such that the door portion is movable away from and towards the frame portion, thereby providing access to the electronic device.

14. The cover plate of claim 11, wherein the frame portion includes at least one plug orifice extending through a surface of the frame portion, the plug orifice configured to provide passage of at least a portion of the electrical cord of the electronic device.

15. The cover plate of claim 11, wherein the electronic device is at least one of a cellular phone, a personal digital assistant, a palmtop, a computing device, an electric razor, a hair dryer, a toothbrush and a curling iron.

16. The cover plate of claim 1, wherein the attachable element is at least one of a clock, a messaging device, an electronic device, a computing device, a tray, a thermostat, a thermometer, a hook, an enclosure, a container, a holder, a bin, a change holder, a mace holder, a bathroom appliance holder, an electrical cord retainer, a kitchen appliance holder, a household item holder, a remote control holder and an electronic device holder.

17. The cover plate of claim 1, wherein the attachable element is configured to retain at least one of an electronic device, a computing device, a cellular phone, mail, currency, money, a wallet, a key, a keyring, an item, an object, a remote control and writing utensil.

18. The cover plate of claim 1, wherein the cover plate, the plate element, the attachable element, the attachment structure or any combination thereof is manufactured from at least one of a plastic material, a synthetic material, a polymeric material and a metallic material.

19. The cover plate of claim 1, wherein the attachable element and the attachment structure are formed as an integral unit.

20. The cover plate of claim 1, wherein the electrical appurtenance is at least one of an electrical outlet, a switch, a knob and an actuator.

21. A cover plate for use in connection with an electrical box, the cover plate comprising:
a plate element configured to attach to and at least partially cover a side of the electrical box, wherein the plate element includes at least one electrical box orifice configured to permit access to at least one electrical appurtenance associated with the electrical box; and
at least one attachable element removably attachable to a portion of the plate element via an attachment structure,
wherein the at least one attachable element is configured to at least one of retain, display and interact with an item,
wherein the attachable element, the attachment structure, the plate element or any combination thereof include a breakaway portion, such that the attachable element breaks away from the plate element upon the occurrence of a predetermined break force.

22. The cover plate of claim 21, wherein the breakaway portion is at least one of a notch, a weakened area and a releasable adhesive material.

23. A cover plate for use in connection with an electrical box, the cover plate comprising:
a plate element configured to attach to and at least partially cover a side of the electrical box, wherein the plate element includes at least one electrical box orifice configured to permit access to at least one electrical appurtenance associated with the electrical box; and
at least one attachable element removably attachable to a portion of the plate element via an attachment structure,
wherein the at least one attachable element is configured to at least one of retain, display and interact with an item,
wherein the attachable element includes a frame portion and a door portion that is movably attached to the frame portion, such that the door portion is movable away from and towards the frame portion, thereby providing access to an attachable element inner retaining area.

24. A cover plate for use in connection with an electrical box, the cover plate comprising:
a plate element configured to attach to and at least partially cover a side of the electrical box, wherein the plate element includes at least one electrical box orifice configured to permit access to at least one electrical appurtenance associated with the electrical box; and
at least one attachable element removably attachable to a portion of the plate element via an attachment structure,
wherein the at least one attachable element is configured to at least one of retain, display and interact with an item,
wherein the attachable element includes a frame portion configured to removably retain an electronic device therein,
wherein the frame portion includes a gripping structure configured to engage and securely hold the electronic device,
wherein the gripping structure is at least one padding element positioned on an inner surface of the frame portion, wherein the electronic device is frictionally engaged within the frame portion via contact with the at least one padding element.

25. A cover plate for use in connection with an electrical box, the cover plate comprising:
a plate element configured to attach to and at least partially cover a side of the electrical box, wherein the plate element includes at least one electrical box orifice configured to permit access to at least one electrical appurtenance associated with the electrical box;
at least one attachable element removably attachable to a portion of the plate element via an attachment structure; and
at least one ancillary-element configured to be removably attachable to at least one of the plate element and the at least one attachable element,
wherein the at least one attachable element is configured to at least one of retain, display and interact with an item.

26. The cover plate of claim 25, wherein the attachable element includes a frame portion and a slot extending at least partially across a surface of the frame element, and wherein the ancillary element is at least one hook having a projecting element extending therefrom, which is configured to engage and slide along the slot.

27. The cover plate of claim 25, wherein the ancillary element is at least one of a clock, a messaging device, an electronic device, a computing device, a tray, a thermostat, a thermometer, a hook, an enclosure, a container, a holder, a bin, a change holder, a mace holder, a bathroom appliance holder, an electrical cord retainer, a kitchen appliance holder, a household item holder, a remote control holder and an electronic device holder.

* * * * *